Sept. 17, 1957
J. F. SILVER
2,806,966
CRYSTAL ASSEMBLY AND PROCESS
Filed Nov. 17, 1953
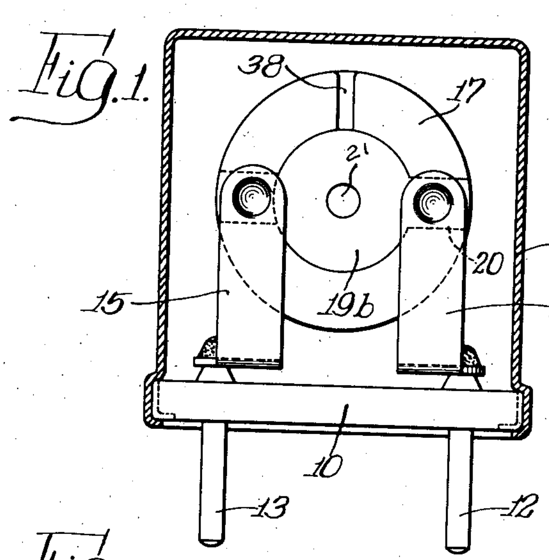
FIG. 1.
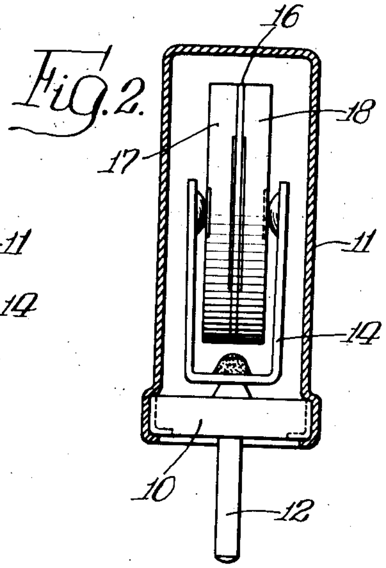
FIG. 2.
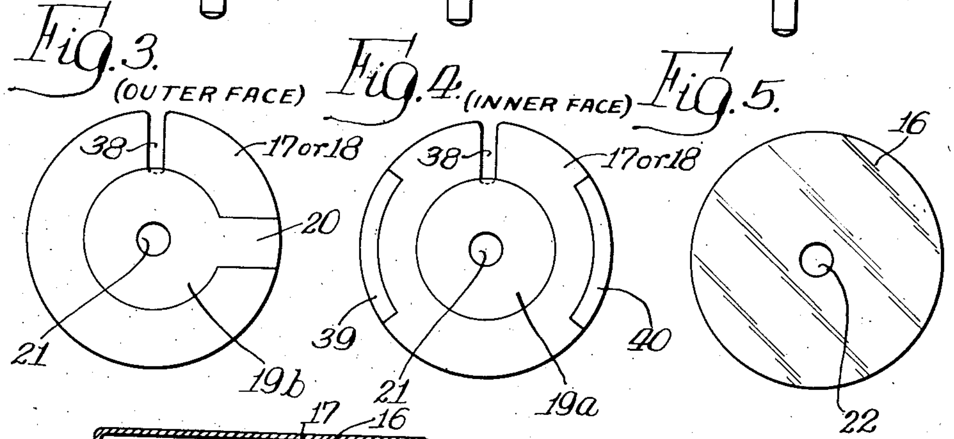
FIG. 3. (OUTER FACE) FIG. 4. (INNER FACE) FIG. 5.
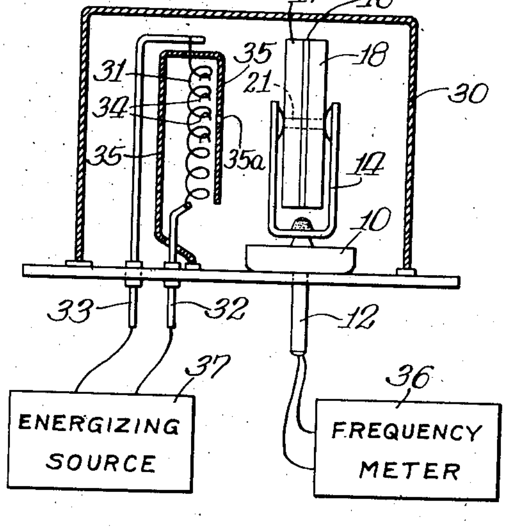
FIG. 6.
INVENTOR.
John F. Silver,
BY
Forman L. Mueller
Atty.

Patented Sept. 17, 1957

2,806,966

CRYSTAL ASSEMBLY AND PROCESS

John F. Silver, Park Ridge, Ill., assignor to Motorola, Inc., Chicago, Ill., a corporation of Illinois Application November 17, 1953, Serial No. 392,633

2 Claims. (Cl. 310—9.1)

The present invention relates to crystal units and more particularly to an improved crystal assembly and to an improved process for fabricating such an assembly.

Two general approaches have been taken in the prior art for providing crystal assemblies for use in oscillator circuits and the like.

One approach is to grind, etch or otherwise process the crystal element, and by repeated testing finally arrive at the desired frequency characteristic thereof. The element is then sandwiched between a pair of pressure plate electrodes and mounted in a suitable housing. Appropriate resilient means are provided for biasing the electrodes with a desired pressure against opposite faces of the crystal so as to make a positive electrical connection between the electrodes and the crystal. This type of mounting offers advantages in that it provides a highly satisfactory mechanical and electrical structure. However, difficulties have been encountered in manufacturing units of this type since it has proved difficult to achieve a desired frequency factor for the unit within narrow tolerances. This obtains since there is no provision in most prior art units of this type for a final frequency adjustment once the crystal element is in place in the housing between the electrodes.

The second general approach is to grind or etch the crystal element to an approximation of the desired frequency factor and then to apply a conductive metal such as aluminum or gold to the opposite faces of the crystal. The metal is usually applied by sputtering or evaporation onto the crystal faces. The frequency factor of the crystal varies with the thickness of the metal coating, and the application of the metal is continued until a thickness is obtained on each surface which provides the exact frequency factor desired for the crystal. Appropriate electrical connections are then soldered to the opposite faces of the crystal to establish electrical contact. This latter unit is advantageous in that it usually can be constructed more cheaply than the first. However, the latter exhibits a tendency to shift in frequency after a cetrain interval of use, and does not possess the rugged mechanical features of the former.

Therefore, the prior art has provided two distinct types of crystal units—a first possessing superior mechanical and electrical characteristics but being difficult to manufacture to a precise frequency characteristic due to the lack of a final frequency adjustment; and a second that may be manufactured with an exact frequency characteristic, but which does not possess the desired mechanical features or frequency stability of the first.

The second unit has taken preference commercially, but as previously noted it has been found that the metal plating on the opposite faces of the crystal has an effect on the maintenance of the crystal at the desired frequency. In other words, it appears that either through aging or through the mechanical results of the vibrations of the crystal, or for some other unknown reason, the plated crystal loses its frequency with time of use and has to be replaced.

Accordingly, it is an object of the present invention to provide an improved crystal unit that is constructed to incorporate the desirable features of both the prior art types of units discussed above.

Another object of the invention is to provide such an improved crystal unit that may readily be established at a desired operating frequency and which retains its frequency factor after prolonged usage.

Yet another object of the invention is to provide an improved crystal unit having desired rugged mechanical characteristics and which may be established at a desired frequency characteristic in an improved and simplified manner.

Still another object of the invention is to provide an improved process for fabricating a crystal unit having the desirable characteristics described above.

A feature of the invention is the provision of a crystal unit of the pressure plate type such as the first type of prior art crystal described herein, in which at least one of the electrodes has an opening extending therethrough to expose a portion of the crystal element, and in which the portion of the crystal element exposed through the opening has a layer of metal deposited thereon through the opening to establish a desired resultant frequency characteristic for the crystal.

Another feature of the invention is the provision of a process in which a crystal element is sandwiched between a pair of electrodes with an aperture in one of the electrodes exposing a portion of the crystal, and in which a suitable metal is deposited on the crystal element through the opening to establish a resultant frequency factor for the crystal.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1 and 2 are different views, partly in section, of a crystal unit constructed in accordance with the invention.

Figures 3, 4 and 5 show various components of the crystal unit of the invention; and Figure 6 shows suitable apparatus for carrying out the process of the invention.

The crystal unit or assembly of the present invention comprises a crystal element and a pair of electrodes between which the crystal element is sandwiched. At least a portion of each of the electrodes is composed of electrically conductive material, and at least one of the electrodes has an opening therethrough to expose a portion of the crystal element. Means is provided for biasing the electrodes with a selected pressure against the crystal element with the electrically conductive portions of the electrodes adjacent the crystal, and the crystal has a metallic coating deposited thereon through the opening on the portion thereof exposed by the opening to establish a desired resultant frequency for the crystal unit within precise tolerances.

Referring now to Figures 1–5, the crystal unit illustrated therein includes a base 10 which may be composed of glass or other suitable insulating material with a metal rim having suitable thermal expansion characteristics, and a casing 11 which, for example, may be composed of a metal such as nickel silver. Casing 11 may be soldered or otherwise affixed to base 10 to seal the components of the unit within the casing.

A pair of electrically conductive prongs 12 and 13 extend through the glass portion of base 10 and these prongs are connected respectively to a pair of resilient metallic clips 14, 15. A disc-like crystal wafer 16 is sandwiched between a pair of disc-like electrodes 17 and 18, and the electrodes and crystal are supported by the clips 14 and 15 in the manner illustrated, the clips biasing the electrodes inwardly against the opposite faces of the crystal wafer. Crystal 16 may be a usual quartz plate that has been ground or etched to a frequency range slightly above the desired frequency, this being achieved by any well-known process.

The electrodes 17 and 18 may be composed of quartz or a suitable ceramic and each has a metallic coating 19*a* on the central portion of its inner face and a metallic coating 19*b* on the central portion of its outer face (Figures 3 and 4). The metallic coatings 19*a* and 19*b* are of gold or aluminum, for example, and are interconnected by a similar coating disposed in a slot 38 in each of the electrodes. Each of the electrodes has a further metal coating 20 on its outer face which extends radially outwardly from coating 19*b* to make electrical contact with clip 14, in the case of electrode 17, and to make electrical contact with clip 15 in the case of electrode 18. Each of the electrodes also has a pair of metal coatings 39, 40 on its inner face, these latter coatings being somewhat thicker than coating 19*a* and serving as pads.

The electrodes 17 and 18 are firmly held against the opposite faces of crystal 16 by clips 14 and 15 with the metallic coatings 39, 40 of the electrodes in physical contact with the opposite faces of the crystal, and with coatings 19*a* within a few thousandths of an inch from the crystal. In this manner, electrical connection is established from clips 14 and 15 to the respective coatings 19*a* on electrodes 17 and 18, causing the crystal to be disposed in an electric field.

As previously discussed, this type of pressure plate mounting for a crystal element is most satisfactory from a mechanical and electrical standpoint, but heretofore has been considered impractical since no satisfactory means has been provided for establishing a final frequency factor for the crystal element once it is mounted in the assembly. The present invention overcomes this deficiency by the provision of a central opening 21 (Figures 3 and 4) in at least one of the electrodes 17 and 18 and by evaporating or otherwise depositing a suitable metal (such as aluminum or gold) through the opening on the portion of the crystal exposed through the opening. This results in a metal spot 22 on the crystal as shown in Figure 5.

The metal may be deposited on the crystal by a vacuum evaporation process by means, for example, of the apparatus illustrated in Figure 6. The apparatus includes a vacuum chamber 30 in which an electrical heater element 31 is mounted with electrical connection being established thereto through prongs 32 and 33. Heater 31 may be wound in the form of a coil and small U-shaped pieces 34 of the metal (such as aluminum or gold) to be evaporated are hung on the heater in the illustrated manner.

The crystal unit of Figures 1–5 is mounted in the vacuum chamber 30 adjacent to shield 35 which has an aperture 35*a* suitably located to allow metal vapor from pieces 34 to strike the crystal through the small hole 21 in the electrode 17 or 18. The prongs from the crystal are connected to a frequency meter 36 and heater 31 is energized by a suitable energizing sources 37.

When the energizing source 37 is connected to heater element 31, the heater melts the metal pieces 34 and causes metal therefrom to be evaporated in the vacuum and the metal vapor is directed toward the crystal unit. The vaporized metal condenses and forms on the metal coating on anything it strikes the object being to cause a metal coating to form on the crystal through hole 21 as spot 22. The evaporation process is continued until frequency meter 36 indicates that the exact frequency has been arrived at, at which time the energizing source is switched off.

The invention provides, therefore, an improved crystal unit of the type in which a crystal blank or element is sandwiched between a pair of electrodes biased against opposite faces of the crystal, and in which a final frequency determination for the crystal can be made in a simple and convenient manner.

While a particular embodiment of the invention has been shown and described, modifications may be made and it is intended in the appended claims to cover all such modifications as fall within the true spirit and scope of the invention.

I claim:

1. A crystal assembly including in combination, a crystal wafer of disc-like configuration having a pair of opposite faces, a pair of disc-like electrodes between which said crystal wafer is sandwiched, a central portion of the inner face of each of said electrodes being composed of metal and at least one of said electrodes having a central opening therethrough to expose a portion of said crystal wafer, a pair of resilient metallic clips for biasing said electrodes against said opposite faces of said crystal wafer with the metallic portions of said electrodes respectively adjacent but spaced from said opposite faces, a conductive connection on each of said electrodes for respectively connecting said resilient metallic clips to said central metal portions of said electrodes, and a metallic coating deposited on said portion of said crystal wafer exposed by said central opening.

2. A crystal assembly including in combination, a crystal wafer of disc-like configuration, a pair of disc-like electrodes of insulating material between which said crystal wafer is sandwiched, a metallic coating disposed on the central portion of the inner face of each of said electrodes, at least one of said electrodes having a central opening therethrough to expose a portion of said crystal wafer, at least one further metal coating on the inner face of each of said electrodes of greater thickness than said first-mentioned metallic coating to function as a pad, a pair of resilient metal clips supporting said electrodes and biasing said further coatings against the opposite faces of said crystal wafer with said first-mentioned metallic coating on each of said electrodes being adjacent but spaced from a corresponding face of said crystal wafer, a further conductive coating on each of said electrodes for connecting a corresponding one of said metallic clips to said first-mentioned metallic coating, and a metallic coating deposited on said portion of said crystal wafer exposed by said central opening.

References Cited in the file of this patent

UNITED STATES PATENTS

| | | |
|---|---|---|
| 2,229,172 | Hawk | Jan. 21, 1941 |
| 2,429,826 | Kuenstler | Oct. 28, 1947 |
| 2,434,266 | Fruth | Jan. 13, 1948 |
| 2,470,737 | Bach | May 17, 1949 |
| 2,497,275 | Samuelson | Feb. 14, 1950 |
| 2,497,666 | Grawley | Feb. 14, 1950 |
| 2,505,370 | Sykes | Apr. 25, 1950 |
| 2,509,478 | Caroselli | May 30, 1950 |